Feb. 15, 1949.  A. ROTHERY  2,462,004
CUSHION
Filed Aug. 18, 1945
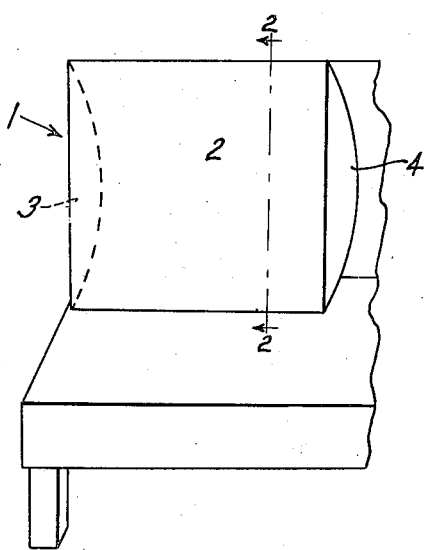
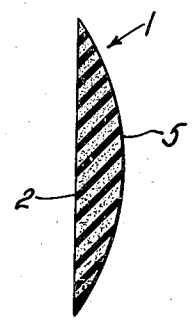
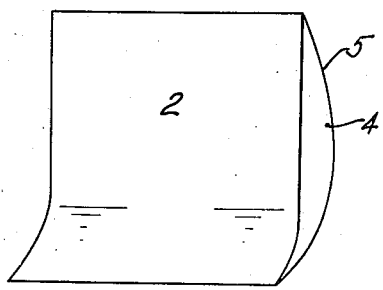
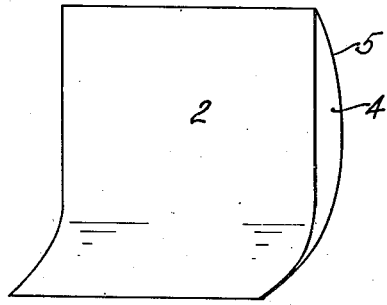
INVENTOR
ALBERT ROTHERY
BY Chapin & Neal
ATTORNEYS Patented Feb. 15, 1949

2,462,004

UNITED STATES PATENT OFFICE 2,462,004

CUSHION

Albert Rothery, Springfield, Mass.

Application August 18, 1945, Serial No. 611,330

2 Claims. (Cl. 155—182)

This invention relates to an improvement in cushions.

The object of the invention is to provide a cushion, so formed and constructed that the user by simply adjusting the position of the cushion may find real comfort for the curvature of the back or the base of the spine.

The cushions may be used in arm chairs or divans and on automobile seats.

In the accompanying drawings,

Fig. 1 is a generally perspective view showing a cushion embodying the invention placed on the seat of a flat divan;

Fig. 2 is a section substantially on line 2—2 of Fig. 1; and

Figs. 3 and 4 are generally perspective diagrammatic views showing the manner and extent to which the cushion can distort.

Referring to the drawings, 1 indicates, generally, a body of soft air foam rubber, which is cool and resilient providing a perfect cushion foundation for purposes of rest. As shown this body of soft air foam rubber has a planar front surface 2 and planar end surfaces 3 and 4 extending at substantially right angles from the front surface 2.

The rear surface 5 extends convexly from the upper edge to the lower edge of the front surface 1, the rear surface, as shown, being substantially a segment of a cylindrical surface. The cushion may vary in dimensions. A satisfactory size for a user of any size or height is 12" x 12" with a depth at the center of two inches.

This form provides "chamfered" edges at the top and bottom, which as shown in Figs. 3 and 4 distort smoothly in response to body pressure and without abruptness at the edges.

I claim:

1. A cushion which comprises, a body of soft air foam rubber having a planar front surface, planar end surfaces at substantially right angles to said front surface and a rear surface extending convexly from the upper edge of the front surface to the lower edge of the front surface.

2. A cushion which comprises, a body of soft air foam rubber having a planar front surface, planar end surfaces at substantially right angles to said front surface and a substantially segmental cylindrical rear surface, the upper and lower edges of the front surface forming the terminal elements of said segmental cylindrical rear surface.

ALBERT ROTHERY.

REFERENCES CITED

The following references are of record in the file of this patent:

UNITED STATES PATENTS

| Number | Name | Date |
|---|---|---|
| 360,442 | Hyde et al. | Apr. 5, 1887 |
| 678,357 | Cavanaugh | July 16, 1901 |
| 1,200,125 | Marymont | Oct. 3, 1916 |
| 1,222,175 | Bobrick | Apr. 10, 1917 |
| 1,322,292 | Claus | Nov. 18, 1919 |
| 1,377,823 | Fitzgerald | May 10, 1921 |
| 1,667,626 | Epstein | Apr. 24, 1928 |
| 2,047,616 | Church | July 14, 1936 |
| 2,138,440 | Boardman | Nov. 29, 1938 |
| 2,237,475 | Church | Apr. 8, 1941 |